US005926323A

United States Patent [19]
Takezawa

[11] Patent Number: 5,926,323
[45] Date of Patent: Jul. 20, 1999

[54] LENS BARREL WITH INTERLOCKING KEY

[75] Inventor: Kazumitsu Takezawa, Yokohama, Japan

[73] Assignee: Nikon Corporation, Tokyo, Japan

[21] Appl. No.: 08/842,571

[22] Filed: Apr. 15, 1997

[30] Foreign Application Priority Data

May 28, 1996  [JP]  Japan ................................ 8-133164

[51] Int. Cl.$^6$ ................................................ G02B 15/14
[52] U.S. Cl. .......................................... 359/696; 359/701
[58] Field of Search .................................. 359/696, 697, 359/699, 700, 701, 704, 828

[56] References Cited

U.S. PATENT DOCUMENTS

| 4,002,405 | 1/1977 | Stahl ........................................ 359/698 |
| 5,689,375 | 11/1997 | Satoh et al. .............................. 359/699 |

FOREIGN PATENT DOCUMENTS 8-334670  12/1996  Japan .

*Primary Examiner*—Georgia Epps
*Assistant Examiner*—Ricky Mack

*Attorney, Agent, or Firm*—Morgan, Lewis & Bockius LLP

[57] ABSTRACT

In a lens barrel which drives a focusing optical system using only one set of a cam groove and a cam pin engaged with the cam groove, the cam groove and the cam pin jointly defining a zooming operation and a focusing operation of the focusing optical system, to increase an automatic focusing speed, there is provided with a manual driving section rotated around an optical axis, an automatic driving section rotated around the optical axis and a rotation straight advance converting section for driving the focusing optical system after converting the rotational motion of the manual driving section or the automatic driving section into a straight advance motion by using only set of the cam groove and the cam pin for jointly defining the zooming and focusing operations of the focusing optical system. The manual driving section, the automatic driving section and the rotation straight advance converting section are interlocked with one another. A power transmitting member for directly transmitting power from the automatic driving section to the rotation straight advance converting section without passing this through the manual driving section is provided.

4 Claims, 6 Drawing Sheets

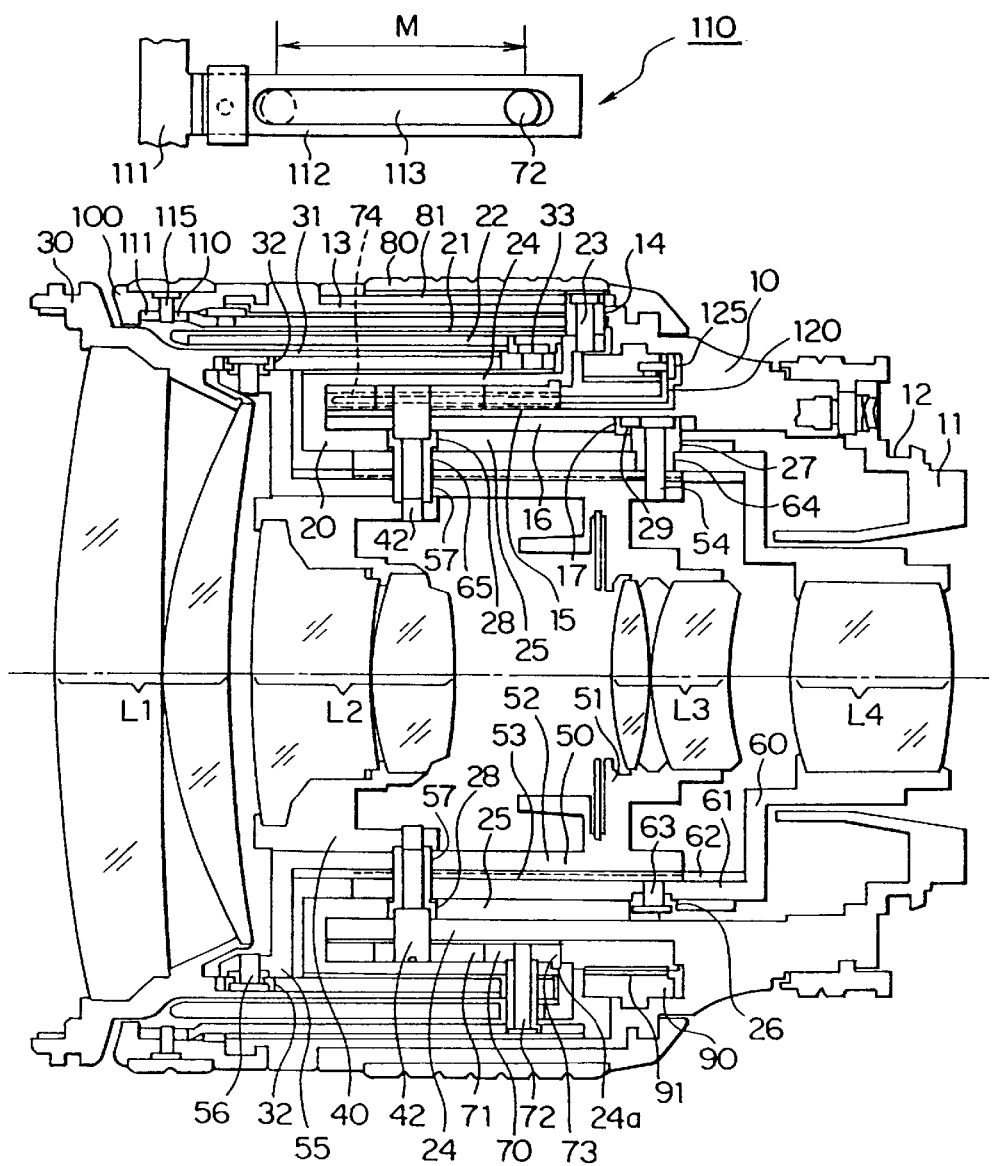

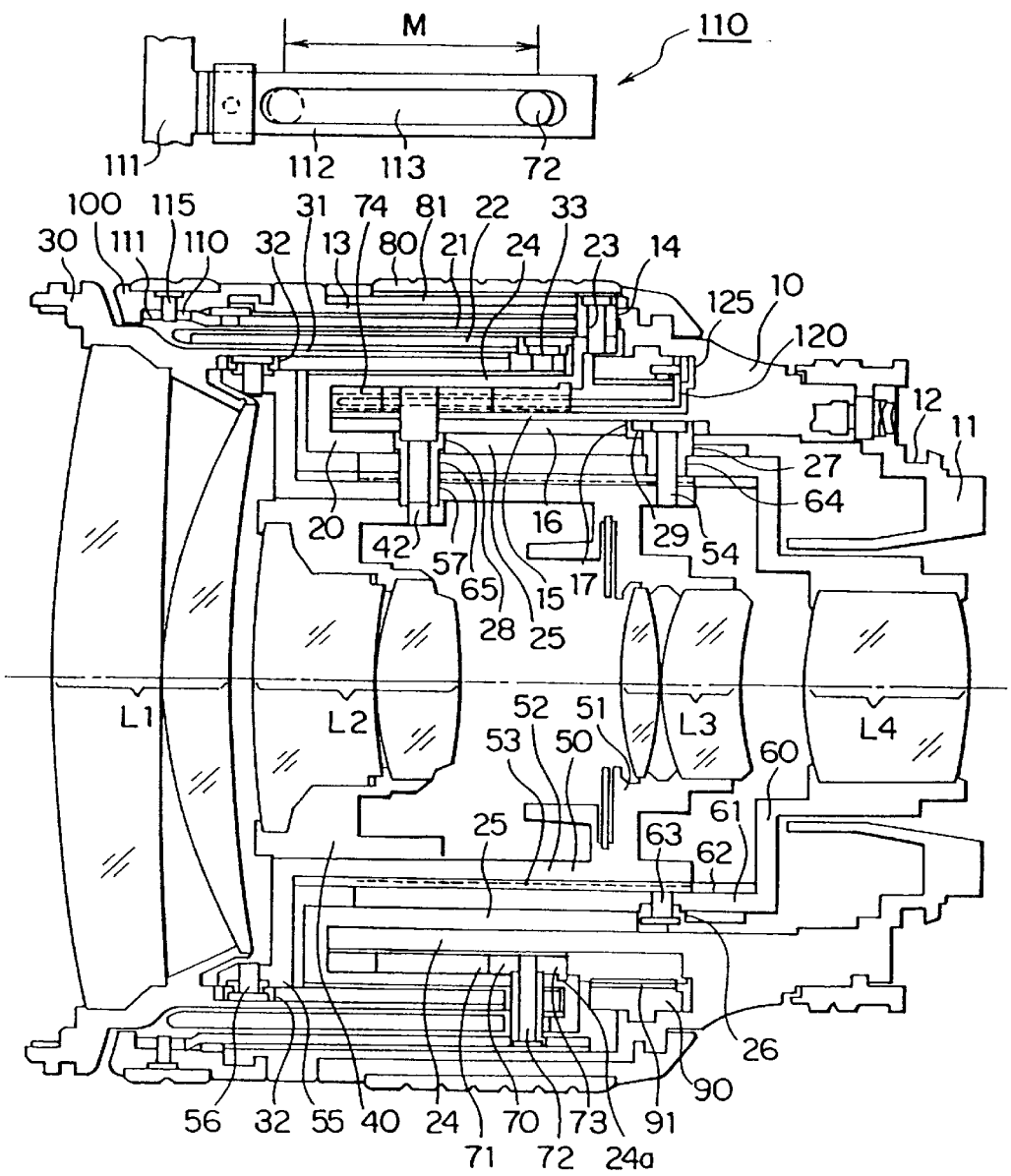
FIG. 2B
FIG. 2A

PRIOR ART
FIG. 3B
PRIOR ART
FIG. 3A
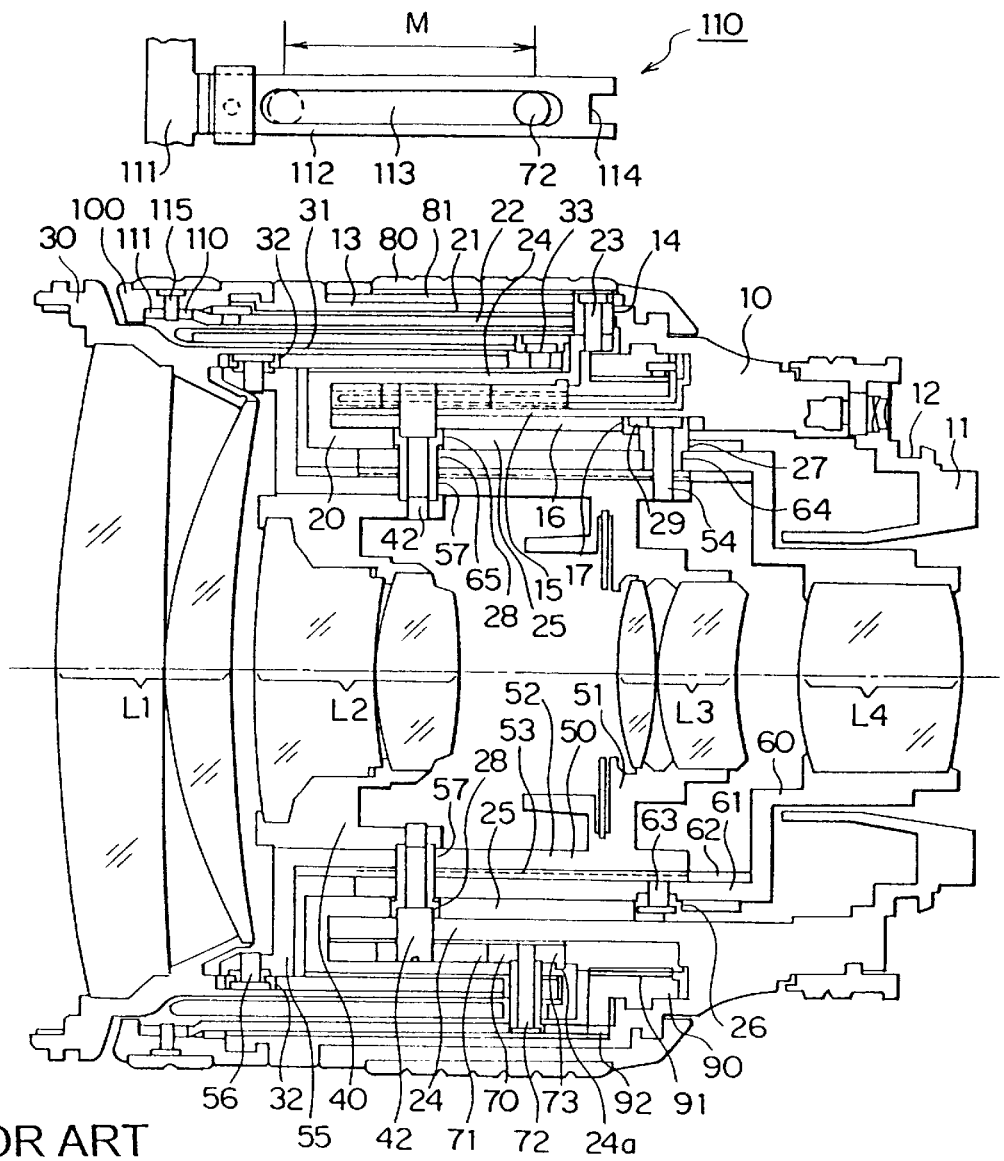

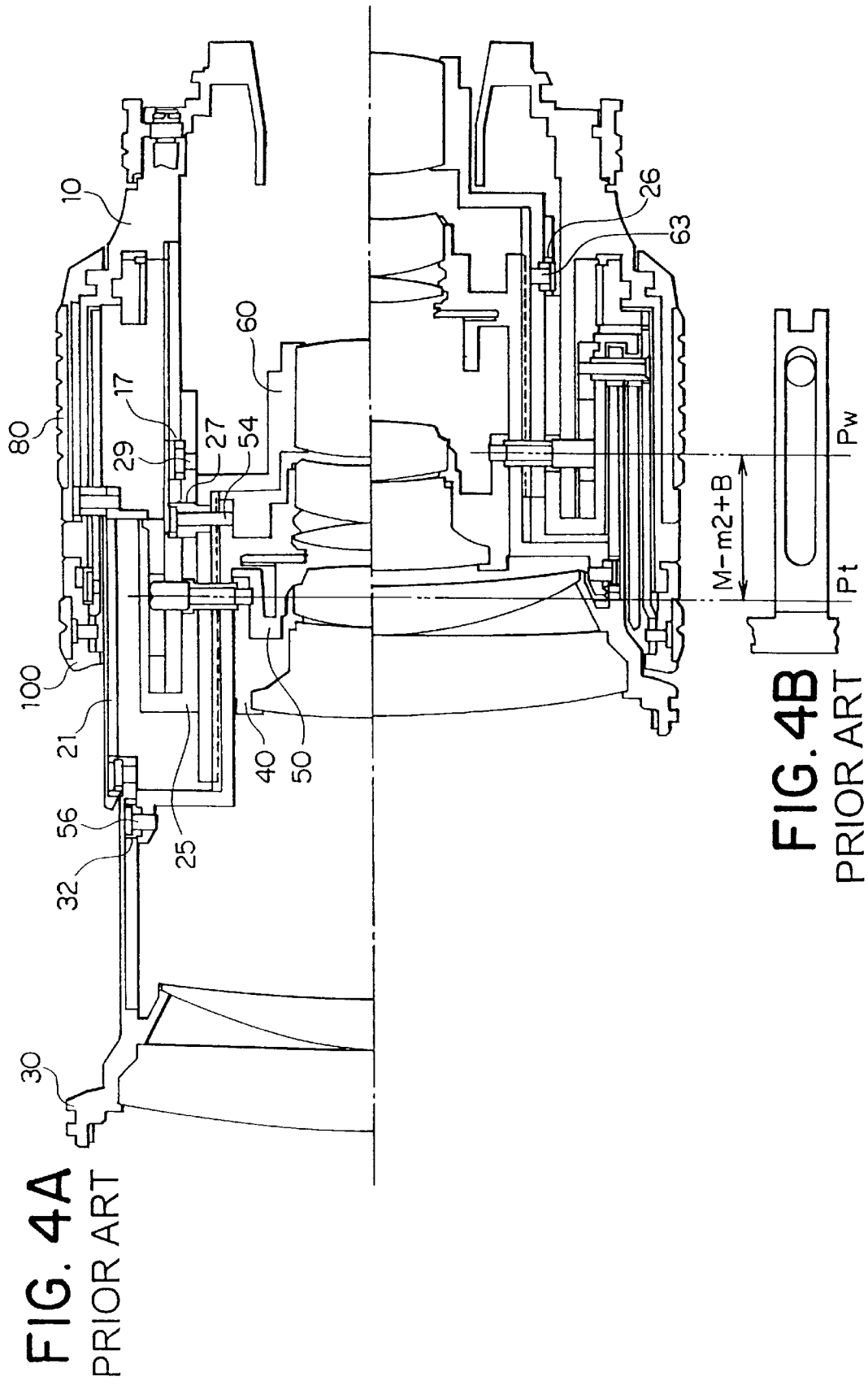

PRIOR ART
FIG. 5
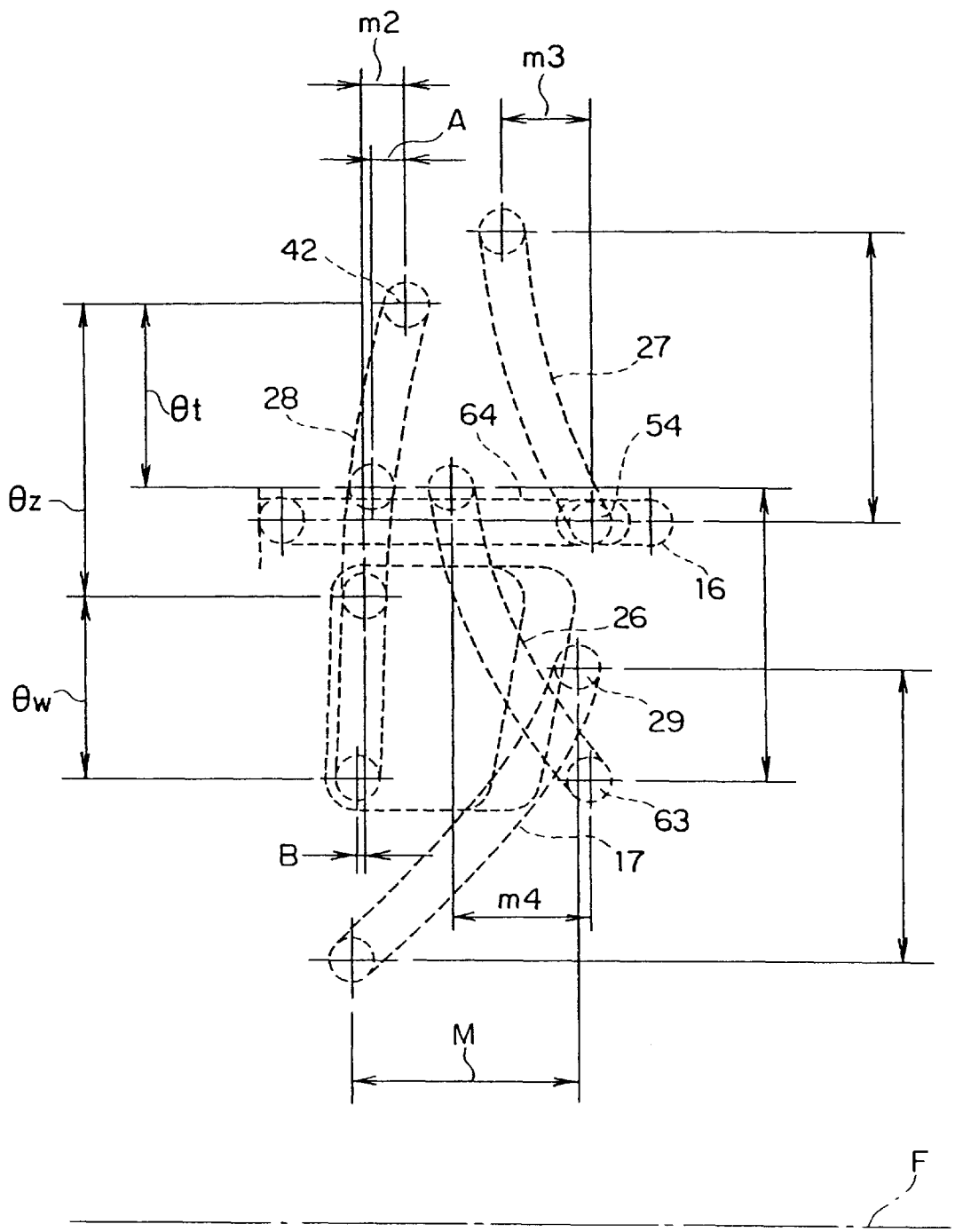

PRIOR ART
FIG. 6
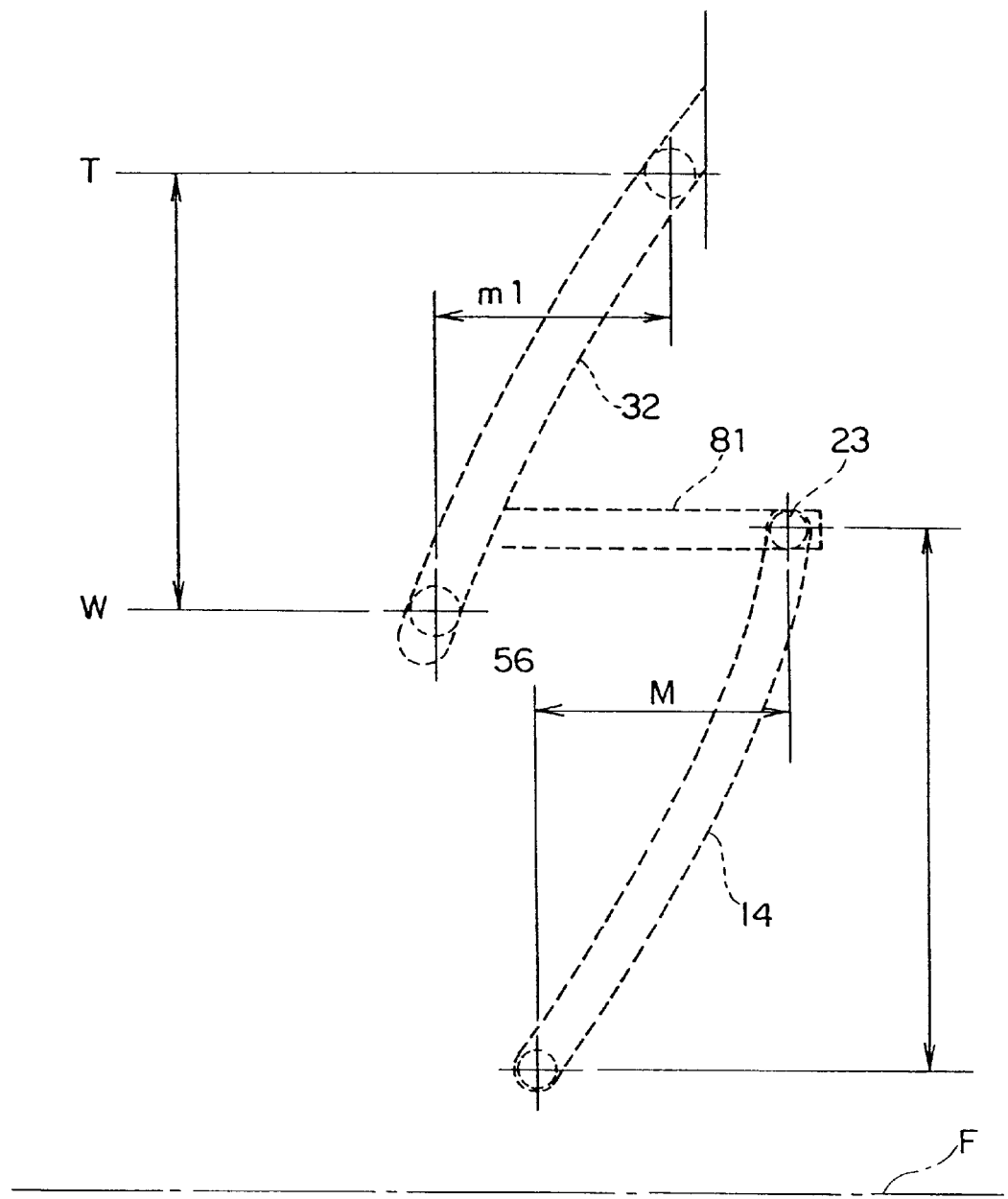

LENS BARREL WITH INTERLOCKING KEY

BACKGROUND OF THE INVENTION

1. Field of the Invention

The present invention relates to a lens barrel for driving a focusing optical system by using only one set of a cam groove and a cam pin engaged with the cam groove, the cam groove and the cam pin jointly regulating the zooming and focusing operations of the focusing optical system.

2. Description of the Related Art

In the lens barrel of this type, a magnification of an image seen through the lens barrel has been adjusted by moving at least a part of the optical system back and forth in the direction of an optical axis so as to change a focal length.

In such a lens barrel, when the range of a magnification to be adjusted is wider, the moving distance of the optical system is longer. This implies that compared with a lens barrel having the range of a focal length from 35 mm to 70 mm, the extended/contracted level of an external size is larger for a lens barrel having the range of a focal length from 28 mm to 80 mm. Also, compared with the lens barrel having the range of a focal length from 35 mm to 70 mm, the moving amount of the optical system is larger for a lens barrel having the range of a focal length from 70 mm to 105 mm, that is, the lens barrel having a larger focal length and a higher magnification, even though the changing amounts of focal lengths are the same between these lens barrels.

Another part of the foregoing optical system performs a focusing operation according to a focusing operation performed from the outside, in addition to the above-noted focal length adjusting operation (hereinafter, this optical system is referred to as "a focusing optical system"). A driving mechanism for driving the focusing optical system is generally composed of a lens moving frame for supporting the optical system, a cam pin installed in the lens moving frame, a cam groove for defining the position of the cam pin in the direction of an optical axis and a focus ring (driving member) having a guiding groove formed in parallel with the optical axis with the tip of the cam pin engaged with the guiding groove. In this driving mechanism, the focus ring is rotated manually or automatically, whereby power of the focus ring in the rotation direction is converted into power in the direction of the optical axis by the cam pin and the cam groove, and then this power is transmitted to the lens moving frame through the cam pin. As a result, the lens moving frame is moved in the direction of the optical axis and focusing is performed.

Thus far, for the lens barrel of this type, there has been produced mainly one having the small moving amount of a lens group and a low magnification, which enables the external size of the barrel to be formed compact. In recent years, on the other hand, there has been an increasing demand for a lens barrel, which is capable of changing a focal length in a wide range from a low magnification to a high magnification.

However, there was a problem inherent in the foregoing conventional lens barrel. The problem is as follows.

If the range of a focal length to be adjusted is made wider, the moving amount of the optical system becomes larger following the focal length adjustment as described above and the focusing optical system moves to the front of the lens barrel by a large amount. Thus, it is also necessary to make longer the guiding groove formed in the focus ring toward the front of the lens barrel according to the movement of the focusing optical system. As a result, the length of the focus ring in the direction of the optical axis is increased and the lens barrel cannot be formed to be compact.

SUMMARY OF THE INVENTION

It is a first object of the present invention to make it possible to perform highly accurate and quick automatic focusing in a lens barrel, which is capable of changing a focal length in a wide range while its external size is compact.

It is a second object of the present invention to prevent a reduction in automatic focusing accuracy and make it possible to perform quick automatic focusing in a lens barrel, which drives a focusing optical system by using only one set of a cam groove and a cam pin engaged with the cam groove, the cam groove and the cam pin jointly regulating the zooming and focusing operations of the focusing optical system.

To solve the foregoing problem, the present invention provides a lens barrel which comprises a manual driving section rotated with center at an optical axis with an external operation, an automatic driving section rotated with center at the optical axis with power from a power source, and a rotational straight advance conversion section for converting the rotational motion of either the manual driving section or the automatic driving section into a straight advance motion and for driving the focusing optical system, by using only one set of a cam groove and a cam pin engaged with the cam groove, the cam groove and the cam pin jointly regulating defining the zooming and focusing operations of a focusing optical system. In the lens barrel which jointly operates with the manual driving section, the automatic driving section and the rotation straight advance conversion section, there is provided with a power transmitting member for directly transmitting power from the automatic driving section to the rotation straight advance section without passing the power through the manual driving section.

Furthermore, in the lens barrel thus constructed, the rotation straight advance conversion section is provided with a first cam pin, which is engaged with the manual driving section, a second cam pin, which transmits a driving force in an optical axial direction to the focusing optical system, the first and second cam pins being arranged in different positions in the direction of an optical axis so as to be movable relatively in the optical axial direction and made to be united in a rotational direction, a relay barrel, which is for relaying a driving force from the first cam pin to the second cam pin, and a cam barrel, which moves the first cam pin and/or the second cam pin in the direction of the optical axis following the motion of the first and/or the second cam pins in the rotational direction. In this case, the power transmitting section is engaged with the relay barrel so as to be relatively movable in the optical axial direction.

The present invention provides a lens barrel, which comprises a manual driving section rotated with center at an optical axial by means of an operation from the outside, an automatic driving section rotated with center at the optical axial by means of power from a power source, a lens moving frame for holding at least a part of a focusing optical system, and a rotation straight advance conversion section for converting the rotational motion of either the manual driving section or the automatic driving section into a straight advance motion and driving the lens moving frame. In the lens barrel thus constructed, the rotation straight advance conversion section is provided with a first cam pin, which is engaged with the manual driving section, a second cam pin, which is provided in the lens moving frame, the first and second cam pins being arranged in different positions of the direction of an optical axis so as to be movable relatively in the optical axial direction and made to be united in a rotational direction, a relay barrel, which relays a driving force from the first cam pin to the second cam pin, and a cam barrel, which moves the first cam pin and/or the second cam pin in the optical axial direction following the motion of the first cam pin and/or the second cam pin in the rotational direction. The lens barrel also includes a power transmitting member, which directly transmits power from the automatic driving section to the relay barrel without passing the power through the manual driving section.

Furthermore, in this case, the lens barrel may be provided with only one first cam pin.

BRIEF DESCRIPTION OF THE DRAWINGS

For a more complete understanding of the present invention and the advantages thereof, reference is now made to the following description taken in conjunction with the accompanying drawings, in which;

FIGS. 1A and 1B are section views each showing a lens barrel of a first embodiment of the present invention;

FIGS. 2A and 2B are section views each showing a lens barrel of a second embodiment of the present invention;

FIGS. 3A and 3B are a section view of a lens barrel of a reference example and a partial side view of a key member used in the lens barrel;

FIGS. 4A and 4B are a section view of the lens barrel of the reference example when this is in a wide condition and a tele condition and a partial side view of the key member used in the lens barrel;

FIG. 5 is a development of a cam groove provided in the lens barrel of the reference example; and FIG. 6 is a development of a cam groove provided in the lens barrel of the reference example and different from the cam groove of FIG. 5.

DETAILED DESCRIPTION OF THE PREFERRED EMBODIMENTS

FIGS. 3A and 3B are section views each showing a zoom lens barrel disclosed in Japanese Patent Application No. 7-142769 (Japanese Patent Publication Laid-open No. 8-334670) (hereinafter, referred to as "reference example"). Specifically, FIG. 3A is a section view taken when the zoom lens barrel pulls each lens group backward. FIG. 3B is a partial side view of a key member used in the zoom lens barrel.

A fixed barrel 10 is a frame body for supporting a cam barrel 20 and other constitutional elements. The fixed barrel 10 comprises a rear part 11, which has a mount section 12 for mounting the lens barrel on a camera body, and large and medium diameter parts 13 and 15, which are positioned before the rear part 11 and in which the center axes thereof are aligned with the optical axis of the lens barrel. The large diameter part 13 is for supporting a zoom ring 80, a focus ring 100, and so on, on its outer peripheral surface and in its tip part. The medium diameter part 15 is for supporting the cam barrel 20, a fourth group lens moving frame 60, and so on. The medium diameter part 15 comprises a guiding groove 16 in its inner peripheral surface, which is in parallel with a cam groove 17 and the optical axis. The guiding groove 16 guides a third group lens moving frame 50 so as to prohibit its rotational motion around the optical axis and allow only its back and forth motion along the optical axis.

On the other hand, the cam groove 17 defines the position of the cam barrel in the direction of the optical axis.

The cam barrel 20 drives four lens moving frames 30, 40, 50 and 60 by obtaining a driving force from the zoom ring 80. The cam barrel 20 is composed of three annular bodies having the same center axis, that is, large, medium and small diameter parts 21, 24 and 25. The large and medium diameter parts 21 and 24 are connected to each other in the rear end part, and the medium and diameter parts 24 and 25 are connected to each other in the tip part, thereby being united as one member together. Therefore, the section of the cam barrel 20 shown in the drawing displays the shape that a portion like a character S and a portion like a mirrored character S face each other with center at the optical axis. The cam barrel 20 is arranged inside the lens barrel such that the outer peripheral surface of its small diameter part 25 be fitted into the inner peripheral surface of the medium diameter part 15 of the fixed barrel 10 and its large and medium diameter parts 21 and 24 are positioned between the large and medium diameter parts 13 and 15 of the fixed barrel 10.

The large diameter part 21 of the cam barrel 20 comprises a guiding groove 22 in its inner peripheral surface, which is in parallel with the optical axis and is used for transmitting the rotational motion of the cam barrel 20 to the first group lens moving frame 30. In addition, the large diameter part 21 of the cam barrel 20 has a pin 23 in its outer peripheral surface rear end. The pin 23 penetrates a relief groove 14 provided in the fixed barrel 10. A tip part of the pin 23 is fitted in a guiding groove 81, which is provided in the inner peripheral surface of the zoom ring 80 in parallel with the optical axis. Thus, a driving force in a rotational direction is transmitted from the zoom ring 80 through the pin 23 and the guiding groove 81 to the cam barrel 20.

The small diameter part 25 of the cam barrel 20 comprises three cam grooves 26, 27 and 28. The cam groove 26 defines the position of the fourth group lens moving frame 60 in the direction of the optical axis. The cam barrel 20 and the fourth group lens moving frame 60 are engaged with each other via the cam groove 26 and a cam pin 63. The cam groove 27 defines the position of the third group lens moving frame 50 in the direction of the optical axis. The tip part of a cam pin 54 penetrating a relief groove 64 provided in the fourth group lens moving frame 60 in parallel with the optical axis, is fitted into the cam groove 27. Here, the cam pin 54 is disposed in the third group lens moving frame 50, and the rotational motion of the cam barrel 20 is converted into a straight advance motion in the direction of the optical axis by the cam pin 54 and then transmitted to the third group lens moving frame 50. The cam groove 28 defines the position of the second group lens moving frame 40 in the direction of the optical axis. A cam pin 42 provided in the outer peripheral surface of the second group lens moving frame 40 and penetrating the relief groove 57 of the third group lens moving frame 50 and the relief groove 65 of the fourth group lens moving frame 60, is fitted into the cam groove 28. Thus, a driving force in the direction of the optical axis can be transmitted to the second group lens moving frame 40.

Furthermore, the small diameter part 25 has a cam pin 29 provided in its rear end outer periphery. The tip part of the cam pin 29 is fitted into the cam groove 17 of the fixed barrel 10. Accordingly, the cam barrel 20 is moved inside the lens barrel in the direction of the optical axis according to the form of the cam groove 17.

The first group lens moving frame 30 is a frame body for positioning a first group lens L1 in the direction of the optical axis. The first group lens moving frame 30 supports the first group lens L1 in the inner peripheral surface of its tip part and has a cylindrical part 31 in a position further back than that for supporting the first group lens L1. The length of the cylindrical part 31 in the direction of the optical axis is equal to that of the large diameter part 21 of the cam barrel 20 and that of the movement of the first group lens moving frame 30 in the direction of the optical axis relative to the cam barrel 20, described later. The cylindrical part 31 has a cam groove 32 in its inner peripheral surface and a pin 33 in the outer periphery of its rear end part. The tip part of a cam pin 56 provided in the outer peripheral surface of the third group lens moving frame 50, is fitted into the cylindrical part 31. Thus, when the first group lens moving frame 30 rotates, the first and third group lens moving frames 30 and 50 move relatively each other in the direction of the optical axis. Also, the tip part of the pin 33 is fitted into the guiding groove 22 of the cam barrel 20. Therefore, a driving force in a rotational direction with center at the optical axis is transmitted from the cam barrel 20 through the pin 33 to the first group lens moving frame 30, and the frame 30 is allowed to smoothly move relative to the cam barrel 20 in the direction of the optical axis.

The second group lens moving frame 40 is a frame body for positioning a second group lens L2 in the direction of the optical axis. The second group lens moving frame 40 supports the second group lens L2 on its inner peripheral surface and has a cam pin 42 provided in the outer peripheral surface of its rear end part. As described above, the cam pin 42 is fitted into the cam groove 28 of the cam barrel 20. Thus, when the cam barrel 20 performs its straight advance motion in the direction of the optical axis, or its rotational motion around the optical axis, the second group lens moving frame 40 is driven in the direction of the optical axis via the cam groove 28 and the cam pin 42.

The third group lens 50 is a frame body for positioning a third group lens L3 in the direction of the optical axis. The third group lens 50 is composed of a rear end part 51, a cylindrical part 52 and a tip part 55. The rear end part 51 supports the third group lens L3 in its inner peripheral surface and has a cam pin 54 provided on its outer peripheral surface. The cam pin 54 penetrates the relief groove 64 of the fourth group lens moving frame 60 and the cam groove 27 of the cam barrel 20, and its tip part is inserted into the guiding groove 16 of the fixed barrel 10. Therefore, the third group lens moving frame 50 is prohibited from performing its rotational motion inside the lens barrel by the guiding groove 16 and allowed only to perform its straight advance motion in the direction of the optical axis.

The cylindrical part 52 is fitted into the outer peripheral surface of the second group lens moving frame 40 in its inner peripheral surface and has a relief groove 57 for passing the cam pin 42 provided in the second group lens moving frame 40. Furthermore, the cylindrical part 52 also has a groove part 53 in parallel with the optical axis. The later-described projecting part 62 of the fourth group lens moving frame 60 is fitted into this groove part 53.

The tip part 55 has a cam pin 56 provided in its outer peripheral surface. The cam pin 56 is fitted, as described above, into the cam groove 32 of the first group lens moving frame 30, and functions for converting the rotational motion of the first group lens moving frame 30 into a straight advance motion in the direction of the optical axis together with the cam groove 32.

The fourth group lens moving frame 60 is a frame body for supporting a fourth group lens L4 on the inner peripheral surface of its rear end part. The fourth group lens moving frame 60 has a cylindrical part 61, which extends in the front direction from a position for supporting the fourth group lens L4. The frame 60 is arranged inside the lens barrel such that the inner peripheral surface of the cylindrical part 61 comes into contact with the outer peripheral surface of the third group lens moving frame 50. The cylindrical part 61 has a projecting part 62 in its inner peripheral surface, which has an elongated shape parallel with the optical axis. As described above, the projecting part 62 is fitted into the groove part 53 provided in the third group lens moving frame 50. Thus, the fourth group lens moving frame 60 is made to be united with the third group lens moving frame 50 in a rotational direction around the optical axis. Here, since the third group lens moving frame 50 does not perform its rotation motion as described above, the fourth group lens moving frame 60 does not also perform its rotational motion.

Furthermore, the cylindrical part 61 has a cam pin 63 provided in the outer peripheral surface of its rear part. The tip part of the cam pin 63 is fitted into the cam groove 26 of the cam barrel 20. Therefore, the fourth group lens moving frame 60 receives a driving force in the direction of the optical axis from the cam barrel 20 through the cam groove 26 and the cam pin 63.

A focus relay barrel 70 is a cylindrical member, which is provided in the inner peripheral surface of the medium diameter part 24 of the cam barrel 20. This member is moved relative to both of the fixed and cam barrels 20 and 10 in a circumferential direction around the optical axis. The focus relay barrel 70 has a flange part 73 in the outer peripheral surface of its rear end part, and this flange part 73 is engaged with the groove part 24a of the medium diameter part 24. The focus relay barrel 70 also has a guiding groove 71, which is in parallel with the optical axis. The tip part of the cam pin 42 is fitted into the guiding groove 71. Therefore, when the focus relay barrel 70 performs no rotational motion, the guiding groove 71 functions as a straight advance guiding groove and limits the motion of the second group lens moving frame 40 to the direction of the optical axis via the cam pin 42. On the other hand, when the focus relay barrel 70 rotates, this rotational motion is converted into a rotational movement in the direction of the optical axis by the cam pin 42 and the cam groove 28, whereby the second group lens moving frame 40 is moved in the direction of the optical axis according to the form of the cam groove 28.

A zoom ring 80 is an annular member for performing a manual rotating operation when a focal length is to be adjusted, and is rotatively attached to the outer peripheral surface of the large diameter part 13 of the fixed barrel. The zoom ring 80 has a guiding groove 81 in its inner peripheral surface, which is in parallel with the optical axis. The pin 23 is fitted into the guiding groove 81, and thus when the zoom ring 80 is rotated, the cam barrel 20 is rotated together with the zoom ring 80.

A segment gear ring 90 is a gear member, to which a driving force for performing automatic focusing is transmitted from a camera body (not shown), and is rotatively provided in the inner peripheral surface of the large diameter part 13 of the fixed barrel 10. The segment gear ring 90 has a segment gear 91 in its inner peripheral surface, and the segment gear 91 is engaged with a driving gear (not shown). The segment gear ring 90 also has a projecting part 92 provided in its outer peripheral surface, which is for transmitting a driving force to a key member 110, described later.

A focus ring 100 is an annular member for performing a manual rotating operation when a focusing operation is to be performed. The focus ring 100 is fitted into the tip of the fixed barrel 10 by a bayonet method and allowed to be rotated by a specified angle. The key member 110 for transmitting the rotational motion of the focus ring 100 to the focus relay barrel 70 is fixed by a small screw 115 in the inner peripheral surface of the focus ring 100.

As shown in FIG. 3B, the key member 110 is composed of an annular part 111, which has an approximately circular form fixed to the inner peripheral surface of the focus ring 100, and an extended part 112, which is extended in a rear direction therefrom and in parallel with the optical axis. The extended part 112 has a guiding groove 113 in its center portion, which is in parallel with the optical axis. As shown in FIG. 3A, the tip part of the cam pin 72 provided in the outer peripheral part of the focus relay barrel 70, is fitted into the guiding groove 113. Therefore, when the focus ring 100 is manually rotated, its rotational motion is transmitted through the key member 110 and the cam pin 72 to the focus relay barrel 70, whereby the focus relay barrel 70 is also rotated. Furthermore, the rotational motion of the focus relay barrel 70 is converted through the cam pin 42 and the cam groove 28 into the motion of the second group lens moving frame 40 in the direction of the optical axis and then a focusing operation is performed. For the guiding groove 113, since the focus relay barrel 70 is moved in the direction of the optical axis integrally with the cam barrel 20, its length in the direction of the optical axis is equal to the later-described moving amount M of the cam barrel 20 in the direction of the optical axis.

The key member 110 has a groove part 114 in its rear end (FIG. 3B), and the projecting part 92 of the segment gear ring 90 is fitted into the groove part 114. Thus, when the segment gear ring 90 is rotated during automatic focusing, its rotation is transmitted through the projecting part 92 and the groove part 114 to the key member 110. As a result, the focus relay barrel 70 performs its rotational motion together with the segment gear ring 90, and as in the case described above, its rotational motion is converted into the motion of the second group lens moving frame 40 in the direction of the optical axis and then automatic focusing is performed. During this period, since the focus ring 100 is also interlocked with the key member 110 relative to its movement, the operational condition of the automatic focusing mechanism can be confirmed from the outside of the lens barrel.

Next, the operation of the reference example will be described.

FIG. 4 is a view showing the reference example. The upper half of FIG. 4A shows a condition, in which the optical system is arranged for image telephotographing (hereinafter, referred to as a tele condition). The lower half of FIG. 4A shows a condition, in which the optical system of the zoom lens barrel is arranged for image wide angle photographing (hereinafter, referred to as a wide condition). Furthermore, FIG. 4B is a partial side view of the key member used in the reference example. FIGS. 5 and 6 are views each showing the movement of each lens group in the reference example. Specifically, FIG. 5 shows in development the relief groove 14, the cam groove 32 and the guiding groove 18. FIG. 6 shows in development the guiding groove 16, the cam groove 17, the cam groove 26 and the cam grooves 27 and 28. In FIGS. 5 and 6, the left side of each paper surface corresponds to the front of the lens barrel, and a chain line F represents a straight line, which is in parallel with the optical axis of the lens barrel.

First, a focusing operation performed in an automatic focusing mode in the reference example will be described.

In the case of the automatic focusing mode, a driving force in a rotational direction is transmitted from the camera body through a well-known power transmitting mechanism (not shown) to the segment gear ring 90 shown in FIG. 3A. Then, this driving force is transmitted from the projecting part 92 to the key member 110, and then from the key member 110 through the cam pin 72 to the focus relay barrel 70 and thereby the focus relay barrel 70 is rotated. Since the tip part of the cam pin 42 is fitted into the guiding groove 71 of the focus relay barrel 70, the cam pin 42 performs its rotational motion in an interlocking manner with the focus relay barrel 70 and then the cam pin 42 moves in the cam groove 28.

When the lens barrel is in a tele condition, the cam pin 42 is moved upward and downward in the upper side of the cam groove 28 shown in FIG. 6. During this period, a maximum rotational angle of the cam pin 42 is $\theta$ t and its moving amount in the direction of the optical axis is A. Therefore, the second group lens moving frame 40 is also moved within the range of a distance A in the direction of the optical axis and thereby focusing is performed.

When the lens barrel of the reference example is changed from the tele condition to a wide condition, since the cam barrel 20 is rotated by an operation, described later, the cam pin 42 is moved to the lower side of the cam groove 28 shown in the drawing. When automatic focusing is performed in this situation, the cam pin 42 is moved in the region of the cam groove 28 represented by a rotation angle $\theta$ w, which is equal to the rotation angle $\theta$ t. As a result, the second group lens moving frame 40 is moved back and forth in the direction of the optical axis only by the length B of the region represented by $\theta$ w in the direction of the optical axis, and thereby focusing is performed.

On the other hand, when a focusing operation is to be performed in a manual focusing mode, the focus ring 100 is manually rotated. The rotational motion of the focus ring 100 is transmitted through the small screw 115 to the key member 110. Thereafter, the rotational motion of the focus ring 100 is converted into the motion of the second group lens moving frame 40 in the direction of the optical axis by the same mechanism and mode as in the case of the automatic focusing mode, and thereby focusing is performed.

Next, the operation of the reference example when focal length adjusting is to be performed will be described. For the purpose of simplifying explanation, it is assumed hereinbelow that the focus relay barrel 70 performs no rotational motion for the cam barrel 20 and the cam pin 42 performs no operations other than one regarding focal length adjusting.

In the reference example, when the lens barrel is in a wide condition, the zoom ring 80 is rotated clockwise seen from the rear side of the lens barrel, this rotational motion is transmitted through the guiding groove 81 and the pin 23 to the cam barrel 20, and the cam barrel is then rotated only by the same angle. After the zoom ring 81 has been rotated clockwise to the limit, in FIG. 6, the cam pin 29 is positioned in the upper end of the cam groove 17 shown in the drawing. As a result, the cam barrel 20 is positioned in a rearmost side with respect to the medium diameter part 15 of the fixed barrel 10, and its entire part is housed in the outer cylinder of the lens barrel as shown in the lower side of FIG. 4.

The cam pins 42, 54 and 63 are respectively positioned in the lower ends of the cam grooves 28, 27 and 26 shown in FIG. 6. Therefore, the second group lens moving frame 40 is positioned first in a front side within the range of its movement relative to the cam barrel 20. Conversely, the third and fourth group lens moving frames 50 and 60 are positioned in rearmost sides (lower side of FIG. 4).

The pin 23 provided in the rear end of the cam barrel 20 is positioned in the upper end of the relief groove 14 shown in FIG. 5, that is, in the rear end of the zoom ring 80.

On the other hand, since the cam groove 32 of the first group lens moving frame 30 shown in FIG. 5 is interlocked with the rotational motion of the cam barrel 20, the cam pin 56 is positioned in its lower end. Therefore, the first group lens moving frame 30 is positioned in a rearmost side within the range of its movement relative to the cam barrel 20, and as shown in the lower side of FIG. 4, the entire cylindrical part 31 of the first group lens moving frame 30 is housed in the large diameter part 21 of the cam barrel 20.

By rotating the zoom ring 80 counterclockwise in the foregoing condition, the lens barrel of the reference example is changed to a tele condition. After the zoom ring 80 has been rotated counterclockwise to the limit, the cam pin 29 is moved to the lower end of the cam groove 17 shown in FIG. 6. As a result, the cam barrel 20 is drawn out forward by a distance M against the medium diameter part 15 of the fixed barrel 10, and as shown in the upper side of FIG. 4A, its part, in particular, the large diameter part 21, is projected forward from the outer cylinder of the lens barrel. In the same manner, the pin 23 is moved to the lower end of the relief groove 14 (FIG. 5), moved forward by a distance M as in the case of the cam barrel 20 and positioned in the front end of the zoom ring 80 (FIG. 4A). The distance M is set to be shorter than the length of the large diameter part 21 in the direction of the optical axis, and thus the rear end of the large diameter part 21 is always positioned in a rearside from the outer cylinder tip of the lens barrel during the foregoing operation.

The cam pins 42, 54 and 63 are moved to the upper ends of the cam grooves 28, 27 and 26 shown in FIG. 6. At this time, the second group lens moving frame 40 is moved backward by a distance m2 from the cam barrel 20 while the third and fourth group lens moving frames 50 and 60 are moved forward respectively by m3 and m4. Therefore, the moving distances of the lens moving frames 40, 50 and 60 from the fixed barrel 10 are respectively M−m2, M+m3 and M+m4.

Meanwhile, the cam pin 56 is moved to the upper end of the cam groove 32, whereby the first group lens moving frame 30 is drawn out forward by a distance m1 from the second group lens moving frame 40. In other words, the first group lens moving frame 30 is drawn out forward by a distance (m1+m3) from the cam barrel 20 and a distance (M+m1+m3) from the fixed barrel 10. As a result, as shown in the upper side of FIG. 4, the entire first group lens moving frame 30 is positioned forward from the outer cylinder of the lens barrel. In addition, an engaging position between the first group lens moving frame 30 and the cam barrel 20, that is, an engaging position between the pin 33 and the guiding groove 22, is moved from the rear end of the guiding groove 22 to its front end by a series of these operations.

By paying attention to the cam pin 42 and the key member 110, through which a driving force for performing a focusing operation is transmitted to the second group lens moving frame 40, the moving amount (M−m2+B) of the cam pin 42 in the direction of the optical axis can be understood from the form of the cam groove 28 shown in FIG. 6. If the cam pin 42 is directly engaged with the key member 110 without going through the focus relay barrel 70, the guiding groove 113 of the key member 110 must be set to be much longer and positioned forward from the lens barrel so as to include at least positions Pt and Pw in the direction of the optical axis as shown by a double dotted broken line. In this case, however, the key member 110 interferes with the first group lens moving frame 30 in the position Pt. In order to prevent this, it is necessary to increase the height of the key member 110 from the optical axis. Consequently, the lens barrel becomes longer in the direction of the optical axis and larger in its outer diameter.

On the contrary, in the reference example, the cam pin 42 and the key member 110 are not directly engaged with each other but engaged with each other via the focus relay barrel 70 and the cam pin 72. This makes an engaging position between the cam pin 72 and the key member 110 in the direction of the optical axis to be set in a rearside from the position of the cam pin 42 in the direction of the optical axis. Therefore, even when the cam pin 42 is moved much to the front of the lens barrel by being interlocked with the movement of the second group lens moving frame 40 in the direction of the optical axis, the engaging position between the cam pin 72 and the key member 110 remains in the middle part of the lens barrel.

Furthermore, since the cam pin 42 and the focus relay barrel 70 are engaged with each other so as to be relatively moved in the direction of the optical axis in the guiding groove 71, the relative movement of the cam pin 42 relative to the cam barrel 20 is entirely absorbed by the guiding groove 71. Therefore, the moving amount of the cam pin 72 in the direction of the optical axis is smaller than that of the cam pin 42. In the reference example, this amount is the same as the moving amount M of the cam barrel 20 in the direction of the optical axis. Accordingly, the length of the guiding groove 113 of the key member 110 in the direction of the optical axis is also set to M.

Thus, in the reference example, by newly providing the focus relay barrel 70, and so on, a focal length can be changed in a wide range and the lens barrel small in its outer diameter can be provided.

In the reference example, in the automatic focusing mechanism from the segment gear ring 90 to the second group lens moving frame 40, the power of the segment gear ring 90 is temporarily transmitted to the key member 110 and then transmitted through the cam pin 72 to the focus relay barrel 70. This means that the power of the segment gear ring 90 is transmitted through a part of the manual focusing mechanism to the focus relay barrel 70. By employing such a mechanism, in the reference example, parts can be efficiently used and the lens barrel can be manufactured at low costs.

However, in the mechanism of the reference example, there are plays between the members in totally three spots, that is, in the fitting part between the projecting part 92 of the segment gear ring 90 and the key member 110, in the fitting part between the key member 110 and the cam pin 72 and in the fitting part between the focus relay barrel 70 and the cam pin 42. Consequently, in the automatic focusing mechanism, the plays in these three spots are accumulated and relatively large plays are created. If such large plays exist in the automatic focusing mechanism, an error becomes large between the operations of the segment gear ring 90 and the second group lens moving frame 40 and consequently accuracy for positioning a focusing lens (second group lens) by automatic focusing is reduced. Therefore, in the reference example, it is difficult to perform highly accurate automatic focusing. In addition, if accuracy for positioning the focusing lens is low, it is difficult to arrange the focusing lens in a specified position for obtaining focusing by one operation of the automatic focusing mechanism. As a result, in the reference example, the automatic focusing mechanism must be repeatedly operated before obtaining focusing and thus quick automatic focusing cannot be secured.

The amount of play in the automatic focusing mechanism changes when constitutional parts are different even if the mechanism is the same. Thus, the plays of the automatic focusing mechanism are dispersed between lens barrels. This dispersion is especially large if the number of fitting parts in the automatic focusing mechanism is large as in the case of the reference example. For this reason, in the reference example, a dispersion in automatic focusing accuracy tends to be increased between the lens barrels and this makes it difficult to provide products uniform in quality.

On the other hand, in the reference example, there were provided with two sets of cam grooves 28 and cam pins 42 for driving the focusing lens. This means that the rotational motion of the zoom ring 80 was converted into a motion in the direction of the optical axis by the two sets of cam grooves 28 and cam pins 42 and then transmitted to the second group lens moving frame 40. The provision of two sets of the same kinds of cam grooves and cam pins is effective in that the play generated in one set of a cam groove and a cam pin is canceled by another set. Therefore, in the lens barrel, generally by providing two sets of the same kinds of cam grooves and cam pins, the play in the entire mechanism is reduced.

However, in the reference example, if the range of a focal length to be adjusted is made much wider, it is impossible to provide two sets of cam grooves 28 and cam pins 42. This is attributed to the fact that the cam groove 28 is for defining both of the focusing operation of the second group lens moving frame 40 and a focal length adjusting operation. The cam groove 28 having two functions is much longer in a circumferential direction compared with, for instance, a cam groove for regulating only a focusing operation. In particular, for the lens barrel having a large focal length range to be adjusted as in the case of the reference example, the cam groove 28 is extremely long in a circumferential direction.

On the other hand, when the cam groove 28 is long in the circumferential direction, the relief groove 57, for the penetration of the cam pin 42 becomes large in a circumferential direction. In addition, the strength of the third group lens moving frame 50 having this relief groove 57 is reduced when the relief groove 57 becomes larger. Thus, if the relief groove 57 exceeds a specified size (if the cam groove 28 is long), the sufficient strength of the third group lens moving frame 50 must be maintained by reducing the number of relief grooves 57 to one. For this reason, if the cam groove 28 is set to be long in order to obtain a wide range for a focal length to be adjusted, the number of sets of the cam groove 28 and the cam pin 42 allowed for the foregoing embodiment is one.

If the number of sets of the cam groove 28 and the cam pin 42 provided for the lens barrel is one, there are no other cam groove and cam pin sets, which can cancel play in this cam groove and cam pin set. For this reason, the play in the cam mechanism becomes larger than that when two sets of cam grooves and cam pins are provided. As a result, if only one cam groove and cam pin set is provided in the reference example, the play in the automatic focusing mechanism is increased, and for the same reason as that described above, automatic focusing accuracy is reduced or it is difficult to perform quick automatic focusing.

Now, the embodiments of the present invention intended to solve the foregoing problems will be described more in detail with reference to the accompanying drawings.

(First Embodiment)

FIG. 1 is a section view of a lens barrel of the first embodiment of the present invention. In FIG. 1, the same codes are used for parts, which perform the same functions as those in the lens barrel shown in FIG. 3. Also, in the explanation below, references overlapping with those made above by referring to FIG. 3 will be omitted as the occasion may demand.

The lens barrel of the embodiment is different from that of the reference example in that an interlocking key 120 is newly provided and the rotational motion of the segment gear ring 90 is transmitted through this interlocking key 120 to the focus relay barrel 70. Other constitutional elements are the same.

The interlocking key 120 is a bar-shaped member, which is arranged in parallel with the optical axis. Its bent end is fixed to the segment gear ring 90 by a screw 125. The part of the interlocking key 120, which includes one end not fixed to the segment gear ring 90, is fitted into the straight advance groove 74 of the focus relay barrel so as to be relatively moved in the direction of the optical axis. Here, the straight advance groove 74 is a groove part, which is provided in the inner peripheral surface of the focus relay barrel 70 in parallel with the optical axis.

Thus, the interlocking key 120 is arranged with its one end fixed to the segment gear ring 90 and another end engaged with the focus relay barrel 70. Therefore, when the segment gear ring 90 is rotated during an automatic focusing operation, its rotational motion is transmitted through the interlocking key 120 to the focus relay barrel 70. The focus relay barrel 70 is then rotated around the optical axis integrally with the segment gear ring 90. The rotational motion of the focus relay barrel 70 is then transmitted to the cam pin 42, and the rotational motion transmitted to the cam pin 42 is converted into a straight advance motion in the direction of the optical axis by the cam pin 42 and the cam groove 28. Thereafter, this straight advance motion is transmitted to the second group lens moving frame 40.

In the embodiment, since the interlocking key 120 is newly provided as described above, in a path from the segment gear ring 90 to the focus relay barrel 70 (automatic focusing mechanism), the number of spots having the play between the members is limited to two, that is, in the fitting part between the interlocking key 120 and the focus relay barrel 70 and in the fitting part between the focus relay barrel 70 and the cam pin 42. This means that for the automatic focusing mechanism of the embodiment, the number of spots having the play is reduced more than that for the automatic focusing mechanism of the lens barrel of the reference example, and thus the amount of play in the entire automatic focusing mechanism is reduced. As a result, in the embodiment, accuracy for positioning the second group lens moving frame 40 in the direction of the optical axis by the automatic focusing mechanism, can be increased, and highly accurate automatic focusing can be performed. In addition, in the embodiment, it is also possible to perform quick automatic focusing without repeatedly actuating the automatic focusing mechanism.

Since the number of spots having the play is reduced in the automatic focusing mechanism, a dispersion of play in the automatic focusing mechanism between the lens barrels, is made small. Therefore, in the embodiment, there is less dispersion in automatic focusing accuracy between the lens barrels, and this makes it possible to easily provide products uniform in quality.

Furthermore, in the embodiment, since the foregoing automatic focusing mechanism has been improved without changing the manual focusing mechanism, which extends from the focus ring 100 to the second group lens moving frame 40, for manual focusing, it is possible to obtain the above-noted effect while maintaining its conventionally good operability.

(Second Embodiment)

FIG. 2 is a section view of a lens barrel of the second embodiment of the present invention. In the embodiment, a lens barrel is constructed such that the range of a focal length to be adjusted is set to be wider than that in the first embodiment while its basic mechanism is the same as that in the first embodiment. Therefore, in this embodiment, the length of the cam groove 28 in a circumferential direction is longer than that in the first embodiment. Therefore, for the above-noted reason, in the embodiment, two sets of cam grooves 28 and cam pins 42 cannot be provided. The rotational motion of the cam barrel 20 is converted into a straight advance motion in the direction of the optical axis by one set of a cam groove 28 and a cam pin 42 and then transmitted to the second group lens moving frame 40. In short, the second embodiment is different from the first in that only one set of a cam groove 28 and a cam pin 42 is provided.

Now, the power transmitting path of the embodiment during automatic focusing will be compared with that of the reference example shown in FIG. 3. In the reference example, as described above, since the power of the segment gear ring 90 is transmitted through a part of the manual focusing mechanism to the focus relay barrel 70, the lens barrel having a good parts efficiency mechanism and manufactured at low costs can be provided.

However, in the mechanism of the reference example, plays exist in the three fitting parts as described above. Therefore, if the number of sets of cam pin 42 and cam groove 28 is reduced to one, the play of the cam mechanism increased by this reduction is further added to the play in the three fitting parts. As a result, the play of the entire automatic focusing mechanism is increased and automatic focusing accuracy is reduced. This may make it impossible to perform quick automatic focusing.

On the contrary, in the embodiment, since the interlocking key 120 is provided, the number of parts for the automatic focusing mechanism is larger than that for the lens barrel of the reference example. However, the number of spots, in which play exists in a path from the segment gear ring 90 to the focus relay barrel 70, is reduced to two, that is, in the fitting part between the interlocking key 120 and the focus relay barrel 70 and in the fitting part between the focus relay barrel 70 and the cam pin 42. In other words, in the embodiment, the mechanism is optimized by reducing the number of fitting parts even at the cost of parts efficiency in order to cancel the play increased by the provision of one set of the cam pin 42 and cam 28 in the entire automatic focusing mechanism. As a result, in the embodiment, since the range of a focal length to be adjusted is expanded more than conventionally, even when only one cam groove and cam pin group for driving the focusing lens group is provided, it is possible to prevent a reduction in focusing accuracy during automatic focusing and perform quick automatic focusing.

Furthermore, in this embodiment, a relief groove provided in the cam barrel 20 for the penetration of the cam pin 72 is also expanded more than that in the first embodiment, because the rotational angle of the cam barrel 20 is increased following the expansion of the range of a focal length to be adjusted. Thus, in the embodiment, the number of cam pins 72 is reduced to one while two has been provided in the first embodiment, an increase in the total area of the relief groove provided in the cam barrel 20 is prevented, whereby the strength of the cam barrel 20 is maintained. As a result, play in the fitting part between the cam pin 72 and the guiding groove 113 of the key member 110 is increased more than that in the lens barrel of the reference example for the same reason described above by taking the cam groove 28 and the cam pin 42 as an example. However, in this embodiment, the interlocking key 120 is newly provided, and power for automatic focusing is not allowed to transmit through the fitting part of the guiding groove 113 and the cam pin 72. Therefore, in this embodiment, even if the play in the fitting part between the cam pin 72 and the guiding groove 113 is increased, its influence never appears in the automatic focusing mechanism.

In the foregoing first and second embodiments, the location in which the interlocking key 120 is engaged with the focus relay barrel 70 shall be the straight advance groove (74) in parallel with the optical axis, and the interlocking key 120 and the focus relay barrel 70 are made relatively movable in the direction of the optical axis. Therefore, it is possible to provide an effect of each embodiment's own while maintaining all the effects provided by the reference example.

That is, in each embodiment, in a wide condition, the large diameter part 21 of the cam barrel 20 is entirely housed in the outer cylinder of the lens barrel, and the cylindrical part 31 of the first group lens moving frame 30, is entirely housed in the large diameter part 21 of the cam barrel 20. Consequently, when the lens group is pulled to the rear side of the lens barrel, the lens barrel of each embodiment becomes short in its full length in the direction of the optical axis and compact in its form.

In addition, in each embodiment, the range of movement for the first group lens moving frame 30 is widened by drawing out the cam barrel 20 from the fixed barrel 10, the third group lens moving frame 50 from the cam barrel 20 and the first group lens moving frame 30 from the third group lens moving frame 50. As a result, in the lens barrel of each embodiment, it is possible to change a focal length in a wide range even if this is formed compact.

Furthermore, in each embodiment, since the second group lens moving frame 40 and the key member 110 are engaged with each other via the focus relay barrel 70 and the cam pin 72, an engaging position between the cam pin 72 and the key member 110 can be freely set in the direction of the optical axis irrespective of the position of the cam pin 42. As a result, each embodiment is effective for increasing the freedom of lens barrel designing. Also, in each embodiment, since an engaging position between the cam pin 72 and the key member 110 is arranged in the rear side of the lens barrel, in which its interference with the first group lens moving frame 30 never occurs, it is possible to reduce the length of the lens barrel in the direction of the optical axis and its outer diameter.

As apparent from the foregoing detailed description, according to the present invention, in the lens barrel for driving the focusing optical system by using only one cam groove, which defines the zooming and focusing operations of the photographing optical system in a common manner, it is possible to prevent a reduction in automatic focusing accuracy and perform quick automatic focusing.

Also, according to the present invention, in the lens barrel capable of changing a focal length in a wide range while its external form is compact, it is possible to provide the above effect.

Furthermore, according to the present invention, in the lens barrel capable of changing a focal length in a wide range while its external form is compact, it is possible to improve automatic focusing accuracy.

Although the preferred embodiment of the present invention has been described in detail, it should be understood that various changes, substitutions and alternations can be made therein without departing from spirit and scope of the inventions as defined by the appended claims.

What is claimed is:

1. A lens barrel comprising:

a focusing optical system;

a driving member rotatable around an optical axis of the focusing optical system and stationary in a direction of the optical axis relative to the lens barrel;

a cam pin connected to the focusing optical system;

a cam member having a cam groove engaging the cam pin, the cam member moving the focusing optical system in the direction of the optical axis by moving the cam pin along the cam groove;

a relay barrel rotatable together with the cam pin, the relay barrel not limiting relative movement of the cam pin in the direction of the optical axis and moving together with the cam member in the direction of the optical axis while being supported by the cam member; and a connecting member interconnecting the driving member and the relay barrel so that the driving member and the relay barrel jointly rotate around the optical axis, the connecting member permitting the relay barrel to move together with the cam member in the direction of the optical axis relative to the driving member.

2. The lens barrel according to claim 1, wherein a zooming operation is performed by rotating the cam member, and a focusing operation is performed by rotating the relay barrel such that the cam pin moves along the cam groove.

3. The lens barrel according to claim 1, wherein the lens barrel includes only one cam pin and one cam groove.

4. The lens barrel according to claim 1, wherein the connecting member is a bar-shaped member extending in the direction of the optical axis and having one end inserted into a groove formed in the relay barrel and extending in the direction of the optical axis.

* * * * *